US 11,418,087 B2

United States Patent
Flaig et al.

(10) Patent No.: US 11,418,087 B2
(45) Date of Patent: Aug. 16, 2022

(54) MODULAR SYSTEM FOR PRODUCING DRIVES COMPRISING A TRANSMISSION UNIT, AN ELECTRIC MOTOR UNIT AND AN ELECTRONIC UNIT

(71) Applicant: EBM-PAPST ST. GEORGEN GMBH & CO. KG, St. Georgen im Schwarzwalk (DE)

(72) Inventors: Markus Flaig, Hardt (DE); Serkan Poyraz, Villingen-Schwenningen (DE); Jürgen Sopejstal, Röthenbach (DE); Volker Messmer, Tengen (DE); Hermann Rappenecker, Vöhrenbach (DE); Jörg Hornberger, Dornstetten-Aach (DE)

(73) Assignee: ebm-papst St. Georgen GmbH & Co. KG, St. Georgen (DE)

( * ) Notice: Subject to any disclaimer, the term of this patent is extended or adjusted under 35 U.S.C. 154(b) by 310 days.

(21) Appl. No.: 16/336,753

(22) PCT Filed: Jan. 10, 2018

(86) PCT No.: PCT/EP2018/050551
§ 371 (c)(1),
(2) Date: Mar. 26, 2019

(87) PCT Pub. No.: WO2018/137930
PCT Pub. Date: Aug. 2, 2018

(65) Prior Publication Data
US 2021/0281147 A1    Sep. 9, 2021

(30) Foreign Application Priority Data
Jan. 30, 2017   (DE) .................. 10 2017 101 739.9

(51) Int. Cl.
*H02K 7/116* (2006.01)
*H02K 5/24* (2006.01)
(Continued)

(52) U.S. Cl.
CPC ............... *H02K 7/116* (2013.01); *H02K 5/24* (2013.01); *H02K 7/003* (2013.01); *H02K 11/215* (2016.01); *H02K 11/33* (2016.01); *H02K 2213/12* (2013.01)

(58) Field of Classification Search
CPC ...... H02K 7/116; H02K 11/215; H02K 11/33; H02K 5/24; H02K 7/003; H02K 2213/12;
(Continued)

(56) References Cited
U.S. PATENT DOCUMENTS 5,170,851 A    12/1992   Kress et al.
5,912,541 A     6/1999   Bigler et al.
(Continued)

FOREIGN PATENT DOCUMENTS

DE    10 2004 033745 A1    1/2006
DE       601 09 874 T2    3/2006
(Continued)

OTHER PUBLICATIONS

Search Report issued by the German Patent and Trademark Office for German Priority Application DE 10 2017 101 739.9, dated Jul. 13, 2017, 5 pgs.
(Continued)

*Primary Examiner* — John K Kim
(74) *Attorney, Agent, or Firm* — Dickinson Wright PLLC (57) ABSTRACT

The present disclosure relates to a modular system for producing drives, in particular piece goods conveyor drives, with different drive properties, comprising at least one first group of transmission units, said first group comprising at least one transmission unit, at least one second group of
(Continued)

motor units, said second group comprising at least one motor unit, and a third group of electronic units, said third group comprising at least one electronic unit for actuating the motor unit, wherein the groups can be combined together in order to produce the drive.

15 Claims, 3 Drawing Sheets

(51) Int. Cl.
*H02K 7/00* (2006.01)
*H02K 11/215* (2016.01)
*H02K 11/33* (2016.01)

(58) Field of Classification Search
CPC ........ H02K 15/00; H02K 15/14; H02K 11/30; H02K 5/04
USPC ................................ 310/51, 68 B, 68 R, 112
See application file for complete search history.

(56) References Cited

U.S. PATENT DOCUMENTS

| | | | |
|---|---|---|---|
| 6,234,037 B1 | 5/2001 | Zimmer | |
| 6,710,505 B1 | 3/2004 | Barani et al. | |
| 9,157,507 B2 | 10/2015 | Zimmermann et al. | |
| 10,301,118 B2 * | 5/2019 | Tiedemann | B65G 23/08 |
| 2002/0060140 A1 | 5/2002 | Nakamura et al. | |
| 2004/0108189 A1 | 6/2004 | Itoh et al. | |
| 2006/0255666 A1 | 11/2006 | Williams et al. | |
| 2007/0194649 A1 * | 8/2007 | Schafer | H02K 5/1732 310/156.32 |
| 2009/0230791 A1 * | 9/2009 | Scharfenberg | H02K 9/18 310/62 |
| 2010/0097027 A1 * | 4/2010 | Jackson | H02P 27/06 318/730 |
| 2012/0133227 A1 * | 5/2012 | Boskovitch | H02K 16/00 310/112 |
| 2014/0085697 A1 * | 3/2014 | Doyle | G02B 26/101 310/112 |
| 2014/0091683 A1 * | 4/2014 | Ito | H02K 11/38 310/68 R |
| 2014/0353062 A1 * | 12/2014 | Bock | H02K 9/00 180/220 |
| 2015/0256049 A1 * | 9/2015 | Gacka | H02K 11/33 310/68 D |
| 2018/0009607 A1 | 1/2018 | Tiedemann | |
| 2021/0281147 A1 * | 9/2021 | Flaig | H02K 5/24 |

FOREIGN PATENT DOCUMENTS

| | | |
|---|---|---|
| DE | 10 2007 010865 A1 | 9/2008 |
| DE | 10 2014 222 171 A1 | 5/2016 |
| EP | 1 950 870 A2 | 7/2008 |
| WO | WO 99/06743 A1 | 2/1999 |
| WO | WO 2004/077644 A2 | 9/2004 |

OTHER PUBLICATIONS

International Search Report for International Application PCT/EP2018/050551, dated Mar. 8, 2018, 5 pgs.

* cited by examiner

MODULAR SYSTEM FOR PRODUCING DRIVES COMPRISING A TRANSMISSION UNIT, AN ELECTRIC MOTOR UNIT AND AN ELECTRONIC UNIT

RELATED APPLICATIONS

This application is the U.S. National Phase under 35 U.S.C. § 371 of International Application No. PCT/EP2018/050551, filed Jan. 10, 2018, which in turn claims the benefit of German Application No. 10 2017 101 739.9, filed Jan. 30, 2017, the contents of which are incorporated herein by reference in their entirety.

FIELD

The present disclosure relates to a modular system for producing drives, in particular piece goods conveyor drives, according to claim 1 as well as a method for producing a drive, in particular a piece goods conveyor drive, using a modular system according to claim 15.

BACKGROUND

It is known from practice that specially designed piece goods conveyor drives are advantageous for different applications. This results in the necessity for a large number of different piece goods conveyor drives. Prefabricated piece goods conveyor drives with or without being equipped with transmissions and/or with or without electronic modules, so that optimum coordination is limited to a desired application.

SUMMARY

The present disclosure advantageously provides drives, in particular piece goods conveyor drives, having different drive properties. This object is achieved by the features of patent claims 1 and 15, while advantageous embodiments and refinements of the disclosure can be derived from the dependent claims.

A modular system for producing drives, in particular piece goods conveyor drives, having different drive properties is proposed, having at least one first group of transmission units, comprising at least one transmission unit, having at least one second group of motor units, comprising at least one motor unit, and having a third group of electronic units, comprising at least one electronic unit for actuating the motor unit, which can be combined with one another for producing the drive, in particular the piece goods conveyor drive.

A "drive" should be understood in particular to refer to an apparatus which is provided for generating and/or transmitting and/or converting energy, in particular chemical energy and/or electrical energy and/or thermal energy and/or a motion characteristic, in particular a rotational motion characteristic, in particular a direction of rotation and/or a rotational speed and/or a torque. In particular the drive is designed as a piece goods conveyor drive, preferably as a rotational drive for a piece goods conveyor roller, which is provided in particular for moving piece goods and/or is designed as motor roller.

The term "provided" should be understood in particular to mean specially programmed, designed and/or equipped. The fact that an object is provided for a certain function should be understood in particular to mean that the object fulfills and/or executes this certain function and at least one application state and/or operating state.

A "drive property" in particular should be understood to refer to a drive characteristic such as a rate/speed/velocity, in particular an angular velocity or a torque or an acceleration ramp and/or a deceleration ramp and/or a direction of rotation and/or a drive power and/or an actuatability. A "transmission unit" should be understood in particular to be a unit that is provided for receiving and/or converting and/or for output of at least one rotational movement and/or a torque, preferably at an input of the transmission unit, preferably at an output of the transmission unit. In particular the transmission unit has at least one transmission ratio between the input of the transmission unit and the output of the transmission unit. The output of the transmission unit is provided in particular for transmitting mechanical energy, preferably rotational energy, to a piece goods conveyor roller.

A "motor unit" should be understood in particular to be a unit that is provided for converting energy in particular chemical energy and/or electrical and/or thermal energy into movement energy, preferably rotational energy. The motor unit preferably has at least one electric motor.

An "electronic unit" should be understood in particular to be a unit that is provided for receiving and/or processing and/or converting and/or outputting an electrical signal and/or a digital signal. In particular the electronic unit is provided for switching and/or regulating and/or monitoring and/or amplifying an electrical process and/or a drive characteristic. Furthermore, the electronic unit is provided in particular for monitoring and displaying a characteristic, for example, an electric target value, and optionally displaying a deviation and/or output of an error message and/or a warning. The electronic unit preferably comprises at least one circuit board. The electronic unit preferably has various functionalities, such as, for example, an output function and/or an electronic control system for an analog target value and/or a CAN bus and/or another bus system that seems appropriate to those skilled in the art, and/or a communications interface, in particular for communication with an external control unit and/or a speed control and/or a direction reversal control and/or a brake function control and/or an energy recovery and/or a load detection and/or a piece goods counting function.

Transmission units, motor units and electronic units are combined into a group. In particular the units of a group have at least essentially identical and/or identically designed interfaces for connection of at least one additional unit of another group and/or are provided for fulfilling an identical higher-level function, wherein specific properties of the higher-level function may be different in particular. The term "essentially identical" should be understood here in particular to mean that the interfaces of all units of a group, in particular all parts of the units of a group involved in a force-locking and/or form-fitting connection of two units, each have the same components and/or are externally free of differences that are discernible with the naked eye, in particular macroscopic differences, in particular differences in shape. A "higher-level function" in this context should be understood to refer in particular to a generalized function accomplished by a unit. In particular the higher-level function of the transmission unit is to translate an input movement into an output movement. In particular the higher-level function of the motor unit is to convert any other form of energy into rotational energy. In particular the higher-level function of the electronic unit is to output and/or process an electrical and/or digital signal.

"Connected in a force-locking and form-fitting manner" should be understood in particular to refer to a releasable connection wherein a holding force between two components is preferably transmitted by a geometric engagement of the components with one another and/or a frictional force between the components.

The fact that the groups can be combined with one another to produce the drives, in particular the piece goods conveyor drives, should be understood in this context in particular to mean that exactly one of the transmission units of the first group can be combined with exactly one motor unit of the second group and with exactly one electronic unit of the third group in producing the drives, in particular the piece goods conveyor drives and preferably to form a drive, in particular a piece goods conveyor drive. In particular at least one of the three groups, preferably all three groups, have more than one unit each. Preferably all units within the same group differ in at least one property. For example, the transmission units have different transmission ratios, according to which a certain transmission unit must be selected from the first group in producing a certain drive, in particular a certain piece goods conveyor drive, and/or the motor units belong to different motor power classes, for example, according to which a certain motor unit must be selected from the second group in producing a certain drive, in particular a certain piece goods conveyor drive, and/or the electronic units belong to different electronic power classes, for example, according to which a certain electronic unit must be selected from the third group in producing a certain drive, in particular a certain piece goods conveyor drive.

Drives, in particular piece goods conveyor drives, can advantageously be provided with various drive properties, inexpensively in particular due to such a modular design. This makes it possible in particular to advantageously achieve a great flexibility. Furthermore, coordination with a desired application can be facilitated advantageously. In addition, it is possible to reduce the multitude of components and/or the cost of storage and warehousing. Furthermore, a simplified renovation and/or simplified modification and/or simplified technical and/or electronic upgrade and/or retrofitting of the drives, in particular the piece goods conveyor drives, can be made possible in particular even by the user himself.

In a preferred embodiment of the present disclosure, it is proposed that the groups of transmission units, motor units and electronic units can be "combined with one another at will. "Combined with one another" should be understood in this context to mean in particular that each transmission unit of the first group, each motor unit of the second group and each electronic unit of the third group, in particular without any changes and/or adjustments, can be used and can preferably be combined to form a drive in any combination with any unit of the other groups in the production of the drives, in particular the piece goods conveyor drives, in particular a piece goods conveyor drive having the desired drive properties. Preferably at least the interfaces for connecting two units, in particular within a group, are designed to be essentially identical to one another in all of the units belonging to the group. This makes it possible to lower costs. Furthermore, this makes it possible to further increase the flexibility in production of drives, in particular piece goods conveyor drives having different drive properties.

Furthermore, it is proposed that the first group shall comprise at least two different transmission units having different transmission ratios, in particular step-down ratios. A "transmission ratio" here should be understood in particular to refer to a change in rotational speed, in particular an increase in rotational speed and/or a reduction in rotational speed between an input of a transmission unit and an output of a transmission unit. In particular the first group comprises at least two transmission units, which are different in particular with regard to a transmission ratio and/or with regard to use of a special gear lubricant which can be designed in particular for different temperature ranges, so that a flexible production of a variety of different drives, in particular piece goods conveyor drives, preferably with different drive properties, in particular different transmission ratios can be achieved advantageously. It is advantageously possible in this way to achieve an optimized coordination of the drives, in particular the piece goods conveyor drives for a desired application. In particular the various transmission units of the first group may each form within a drive, in particular a piece goods conveyor drive, a certain function unit but with different function elements, for example, different gearwheels having different gearings. In particular each transmission unit of the first group has at least one defined interface to an add-on of a motor unit of the second group. The interface preferably has a push-on pinion of the transmission units, which is provided in particular to form a transmission element of the transmission units, especially preferably the input of the transmission units, for example, a sun wheel of a planetary gear and/or a direct receptacle for a drive shaft of the motor units, wherein the drive shaft preferably has gearing, which is provided in particular to impart the function of the gear element and/or the input to the drive shaft. Simple and rapid assembly of drives, in particular piece goods conveyor drives, with the desired drive properties, in particular with the desired transmission ratios, can be accomplished by a layman in this way, in particular with the aid of operating instructions Furthermore, it is proposed that the second group shall comprise at least two motor units having different motor power classes, so that a flexible production of a plurality of different drives, in particular piece goods conveyor drives, preferably with different drive properties, in particular different retrievable drive powers can be made possible advantageously. Therefore, optimized coordination of the drives, in particular the piece goods conveyor drives, for a desired application can be achieved advantageously. In particular the motor units of the second group within a drive, in particular a piece goods conveyor drive may form a certain function unit, but with different function parameters, for example, different power levels and/or different voltage levels furnished by the motor units. In particular, each motor unit of the second group has at least one defined interface with an add-on of an electronic unit of the third group. It is advantageously possible in this way to achieve rapid and simple assembly of drives, in particular piece goods conveyor drives having the desired drive properties, in particular with the desired function parameters of the motor units, and it is possible in particular for a layman to accomplish such an assembly in this way with the aid of operating instructions.

In a preferred embodiment of the present disclosure, the second group comprises at least two motor units having different motor voltage classes, so that a flexible production of a variety of different drives, in particular piece goods conveyor drives, preferably with different drive properties can be achieved advantageously in particular with different voltage levels of the motor units. It is therefore advantageously possible to achieve an optimized coordination of the drives, in particular the piece goods conveyor drives for a desired application.

In addition, it is proposed that the third group shall comprise at least two electronic units belonging to different electronic power classes so that flexible production of a variety of different drives in particular piece goods conveyor drives, preferably with different drive properties, in particular different lower levels of the electronic units can be enabled advantageously. In particular the electronic units of the second group within a drive, in particular a piece goods conveyor drive may form a certain function unit but with different function parameters, for example, different power levels of the electronic units and/or different voltage levels of the electronic units and/or different functionalities of the electronic units. In particular each electronic unit of the third group has at least one defined interface with an add-on of a motor unit of the second group. In this way it is advantageously possible to achieve a rapid and simple assembly of drives, in particular piece goods conveyor drives with the desired drive properties, in particular with the desired function parameters of the electronic units which can be accomplished in particular by a lay person with the aid of operating instructions.

Furthermore, it is proposed that the third group shall comprise at least two electronic units having different electronic voltage classes so that a flexible production of a variety of different drives in particular piece goods conveyor drives, preferably with different drive properties, in particular with different voltage levels of the electronic units can be made possible. In this way it is advantageously possible to achieve an optimized coordination of the drives, in particular the piece goods conveyor drives for a desired application.

In another preferred embodiment of the present disclosure, the third group comprises at least two electronic units belonging to different electronic function classes. An "electronic function class" here should be understood in particular to refer to the presence of at least one functionality, preferably a combination of functionalities such as, for example, an output function and/or a regulating electronic system for an analog target value and/or a CAN bus and/or an additional bus system that appears to be appropriate to those skilled in the art and/or a communications interface, in particular for communication with an external control unit and/or a speed control and/or a direction reversal control and/or a brake function control and/or an energy recovery and/or a load detection and/or a piece goods counting function. It is advantageously possible in this way to have flexible production of a variety of different drives, in particular piece goods conveyor drives, preferably with different drive properties, in particular with different functionalities of the electronic units. In this way an optimized coordination of the drives, in particular the piece goods conveyor drives for a desired application can be achieved advantageously.

Furthermore, it is proposed that the modular system shall have a fastening unit which is provided for connecting the transmission units and/or the motor units and/or the electronic units mechanically and at least partially in a vibration-isolated manner to at least one additional component, in particular to a component that is different from the modular system. A component different from the modular system may be designed in particular as a housing and/or as a frame, preferably as a frame of a piece goods conveyor. "Mechanically connected" should be understood in particular to refer to connectability by at least one physical connecting element. The phrase "connected at least partially in a vibration-isolated manner" in this context should be understood in particular to mean that two connected components have restricted mobility with respect to one another and a connection of two components is provided with damping and/or is subject to a tolerance. The phrase "having restricted mobility with respect to one another" as used here should be understood in particular to mean that a change in distance, in particular at least partially in a horizontal direction and/or at least partially in a vertical direction of two units is possible, wherein in particular one preferably both units contribute to the change in distance. The possible change in distance in particular amounts to max. 5 mm, preferably max. 1 mm, especially preferably max. 0.5 mm and especially min. 0.1 mm. Two components connected in this way preferably form a so-called "two-component part." It is therefore advantageously possible to prevent transfer of vibration and/or vibrational movement from one component to another component connected to it so that any load on the material can thereby be reduced advantageously. Furthermore, due to the at least partially vibration isolated connection, an acoustic isolation and thus noise reduction can be achieved advantageously.

The electronic units can preferably be arranged on sides of the transmission units that are remote from the output and/or the electronic units and the transmission units may be arranged on opposition sides of the motor units, thereby achieving an advantageous arrangement which can result in particular in an advantageous saving of installation space in the production of drives, in particular piece goods conveyor drives.

In addition, it is proposed that the motor units shall have at least essentially identical drive shafts which are provided for coupling to the transmission units. The drive shafts preferably have gearing on at least one end. In particular, the at least essentially identical drive shafts are provided for being couplable to all the transmission units of the first group. It is therefore advantageously possible to achieve a further increase in flexibility in production of drives, in particular piece goods conveyor drives. Furthermore, it is advantageously possible to reduce the complexity, in particular by means of a reduction in the number of different elements required for coupling so that a cost reduction can be achieved advantageously. It is conceivable for coupling to be accomplished by means of a force-locking and/or form-fitting insertion of the geared drive shafts into the receptacle elements of the transmission units provided for them. It is therefore advantageously possible to achieve a facilitated assembly and dismantling. Furthermore, it is conceivable for the coupling of the motor units to the transmission units to be at least partially physically bonded. The term "coupled in a physically bonded manner" should be understood in particular to mean that the ground parts are held together by atomic or molecular forces such as those created by soldering, welding, adhesive bonding and/or vulcanization.

Furthermore, it is proposed that the at least one, preferably at least two or especially preferably all of the transmission units of the first group have a push-on pinion which is provided for receiving the drive shafts. A "push-on pinion" should be understood in particular to refer to a gearwheel which preferably has a recess provided for enabling a coupling to an additional component, in particular a drive shaft of a motor unit, preferably by means of a force-locking and/or form-fitting connection. It is therefore advantageously possible to achieve a facilitated assembly and dismantling. Furthermore, renovation and/or a technical and/or electronic upgrade and/or retrofitting of the drive, in particular of the piece goods conveyor drive can be facilitated advantageously. Furthermore, it is conceivable for the drive shaft to be formed in one piece with the push-on pinion and/or for some of the transmission units in particular to be designed without the push-on pinion, in which case the transmission units are preferably provided for gear engagement directly with the drive shaft, which has gearing, and/or for the drive shaft to form a sun wheel of the planetary gear.

In a particularly preferred embodiment of the present disclosure, the motor units have at least essentially and preferably completely identical magnetic sensors, which are provided for coupling to the electronic units, so that a further increase in flexibility in the production of drives, in particular piece goods conveyor drives, can be achieved advantageously. In addition, it is advantageously possible to reduce the complexity, in particular by reducing the number of different elements required for a coupling, so that a reduction in cost is advantageously feasible. In particular, each motor unit has at least one, preferably exactly one, magnetic sensor. A "magnetic sensor" should be understood in particular to be a sensor unit, which is provided to receive and/or to register and/or to send out and/or to modulate and/or to generate a magnetic field and/or a change in a magnetic field. In particular, the magnetic sensor may be designed at least partially as a sensor magnet and/or as a Hall sensor and/or as a coil and/or as a permanent magnet and/or as another magnetic sensor, with which those skilled in the art are familiar. In particular the magnetic sensor may be provided for detecting a vibration and/or determining positions of an electric motor and/or detecting a rotational movement of the piece goods conveyor roller and/or of the electric motor and/or detecting an operating mode of the drive, in particular of the piece goods conveyor drive. The magnetic sensors preferably cooperate electronically with the electronic units, so that a signal transmission, in particular an information transmission between motor units and electronic units, can be achieved advantageously.

Furthermore, a method for producing drives, in particular piece goods conveyor drives using a modular system is proposed, with at least one first group of transmission units, comprising at least one transmission unit, with at least one second group of motor units, comprising at least one motor unit, and a third group of electronic units, comprising at least one electronic module for actuating the motor unit, such that at least one transmission unit from the first group, at least one motor unit from the second group and at least one electronic unit from the third group are combined with one another to produce a drive, in particular a piece goods conveyor drive, having the desired drive properties. In this way, drives, in particular piece goods conveyor drives, having different drive properties can be supplied inexpensively. In particular, it is advantageously possible in this way to achieve a high flexibility. Furthermore, a simplified renovation and/or simplified modification and/or simplified technical and/or electronic upgrade and/or retrofitting of drives, in particular piece goods conveyor drives, in particular by the user himself is/are made possible.

The modular system should not be limited here to the application and embodiment described above. In particular the modular system may have a number different from the number of individual elements, components and units mentioned herein, to fulfill a functioning described herein.

BRIEF DESCRIPTION OF THE DRAWINGS

Additional advantages are derived from the following description of the drawings. The drawings illustrate one embodiment of the present disclosure. The drawings, the description and the claims contain numerous features in combination. Those skilled in the art will expediently also consider the features individually and combine them into appropriate additional combinations.

In the drawings.

DETAILED DESCRIPTION

Figure 1:
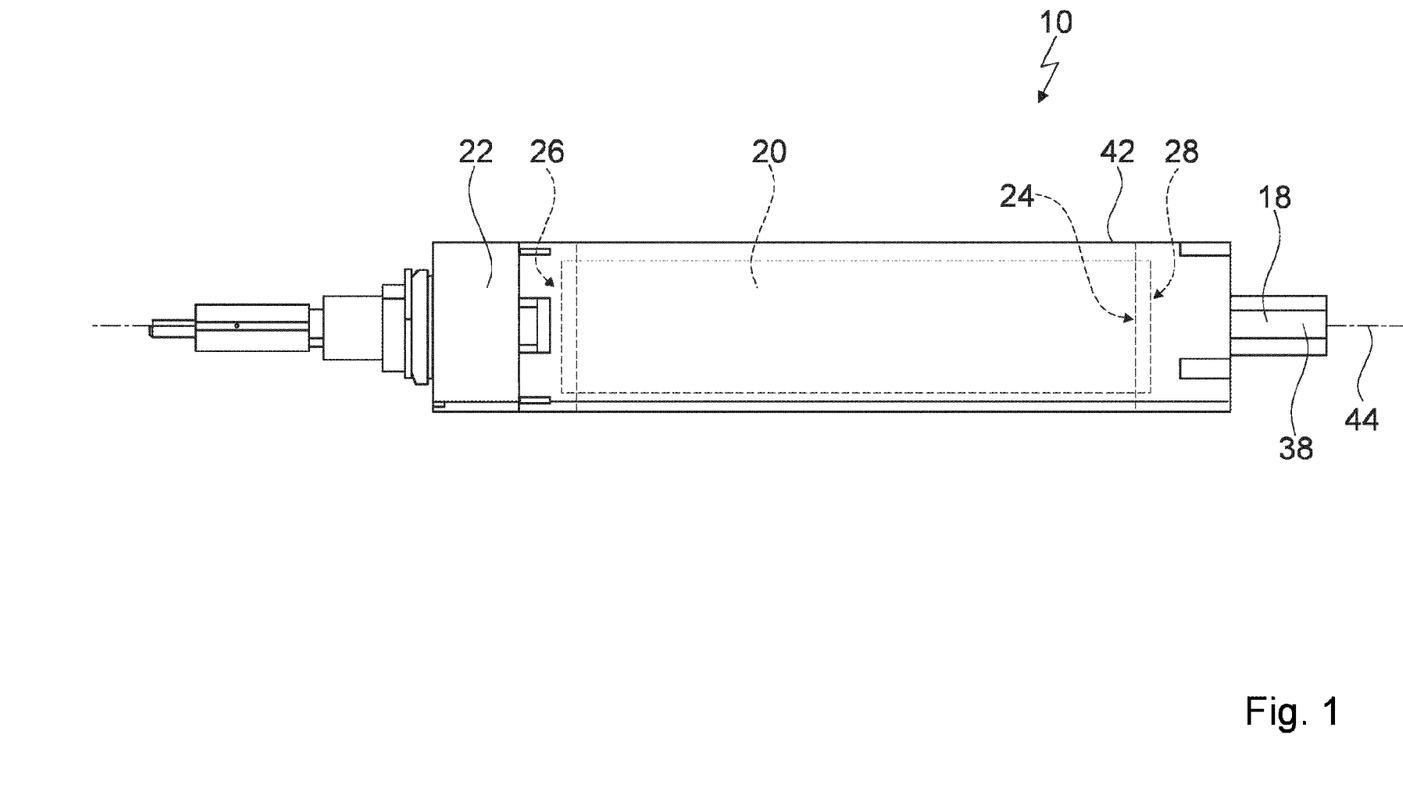
FIG. 1 shows a simplified schematic diagram of a drive.

FIG. 1 shows an example of a drive 10. The drive 10 is designed as a piece goods conveyor drive, in particular as a motor roller. The drive 10 has a transmission unit 18, a motor unit 20 and an electronic unit 22. The electronic unit 22 is mechanically connected to the motor unit 20. The connection between the electronic unit 22 and the motor unit 20 is a press connection. The electronic unit 22 is pressed into the motor unit 20. The drive 10 has a housing 42. The electronic unit 22 is partially inserted into the housing 42. The transmission unit 18 is partially inserted into the housing 42. The motor unit 20 is completely enclosed in the housing 42 in the circumferential direction.

The electronic unit 22 is arranged on a side 24 of the transmission unit 18 remote from the output. The motor unit 20 is arranged on a side 24 of the transmission unit 18 remote from the output. The electronic unit 22 and the transmission unit 18 are arranged on opposite sides 26, 28 of the motor unit 20.

Figure 2:
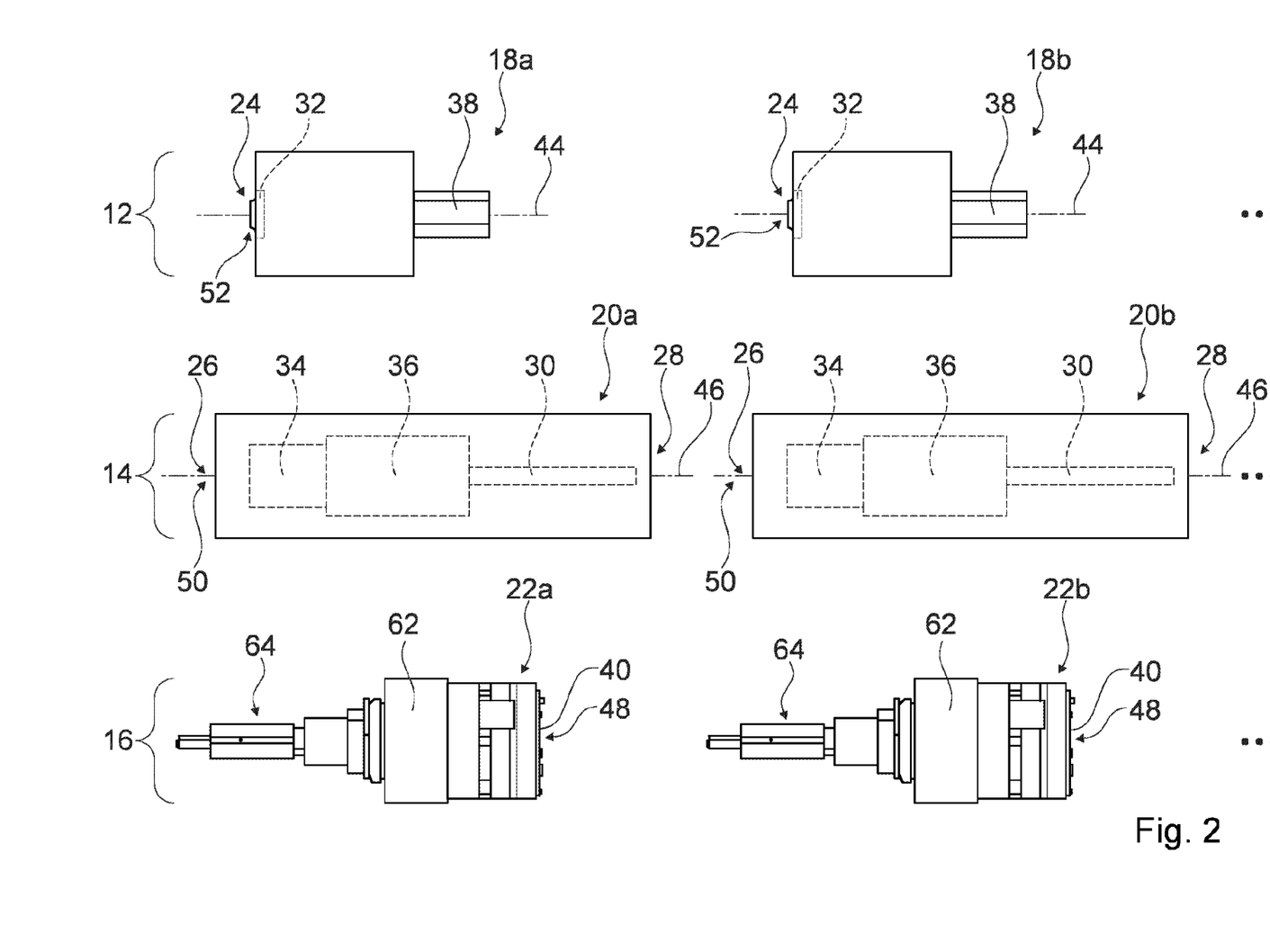
FIG. 2 shows a modular system for producing drives.

FIG. 2 shows a modular system for producing drives 10 having different drive properties. The drive 10 from FIG. 1 is produced with the help of the modular system. The modular system comprises a first group 12 of transmission units 18a, 18b. The first group 12 here comprises, for example, two transmission units 18a, 18b designed to be different from one another. The first group 12 may also comprise in particular more than two transmission units 18a, 18b or just one single transmission unit 18a, 18b. The outside dimensions of at least two, preferably all, transmission units 18a, 18b of the first group 12 are designed to be essentially identical to one another. The transmission units 18a, 18b have different transmission ratios. The transmission units 18a, 18b each have a push-on pinion 32 for receiving a drive shaft 30 of motor units 20a, 20b. The transmission units 18a, 18b have a transmission interface 52. The push-on pinion 32 represents a defined transmission interface 52 of the transmission units 18a, 18b for adding on the motor units 20a, 20b. It is also conceivable for at least one transmission unit 18a, 18b to have a transmission interface 52 without a push-on pinion 32 and for the drive shaft 30 to be provided for meshing directly with the transmission unit 18a, 18b. The transmission units 18a, 18b each have an output 38. The output 38 is provided for output of an output rotational movement about an output axis of rotation 44.

Furthermore, the modular system comprises a second group 14 of motor units 20a, 20b. The second group 14 here comprises, for example, two motor units 20a, 20b designed to be different from one another. The second group 14 may also comprise in particular more than two motor units 20a, 20b or just one single motor unit 20a, 20b. The outside dimensions of at least two, preferably all motor units 20a, 20b of the second group 14 are designed to be essentially identical to one another. The motor units 20a, 20b belong to different motor power classes. The motor units 20a, 20b belong to different motor voltage classes. The drive shafts 30 of the motor units 20a, 20b are designed to be identical to one another. The drive shafts 30 are provided to produce a coupling with the transmission units 18a, 18b. The motor units 20a, 20b each have a defined motor interface 50 for being added onto the electronic units 22a, 22b. The drives shafts 30 are arranged on opposite sides 28 of the motor units 20a, 20b opposite the motor interfaces 50.

The motor units 20a, 20b have an electric motor 36. The electric motor 36 is provided for generating a rotational movement of the drive shaft 30 about a drive axis of rotation 46. The motor units 20a, 20b each have a magnetic sensor 34. The magnetic sensors 34 are provided for coupling to electronic units 22a, 22b. The magnetic sensors 34 are designed to be identical to one another.

The modular system also comprises a third group 16 of electronic units 22a, 22b. The electronic units 22a, 22b are provided to actuate the motor units 20a, 20b. The third group 16 here comprises two electronic units 22a, 22b, for example, designed to be different from one another. The third group 16 may in particular also comprise more than two electronic units 22a, 22b or only a single electronic unit 22a, 22b. The outside dimensions of at least two, preferably all, electronic units 22a, 22b of the third group 16 are designed to be essentially identical to one another. The electronic units 22a, 22b belong to different electronic power classes. The electronic units 22a, 22b belong to different electronic voltage classes. The electronic units 22a, 22b belong to different electronic function classes. The electronic function classes differ from one another in the presence of at least one different functionality, preferably a different combination of functionalities. The electronic units 22a, 22b each have a circuit board 40. Electronic units 22a, 22b each have a defined electronic interface 48 to be added onto the motor units 20a, 20b.

The modular system, in particular the electronic units 22a, 22b, have a fastening unit 64. The fastening unit 64 is provided to connect the electronic units 22a, 22b mechanically and at least partially by a vibration isolated connected to at least one component different from the modular system. Furthermore, it is conceivable for the fastening unit 64 to be provided for connecting the transmission units 18a, 18b and/or the motor units 20a, 20b mechanically and at least partially in a vibration isolated manner to at least one component different from the modular system. The electronic units 22a, 22b have a mechanical isolation 62 for vibration isolation. The mechanical isolation 62 isolates the electronic units 22a, 22b in particular the drive 10 at least partially from vibrations, in particular those coming from the outside.

To produce a drive 10, the first group 12 of transmission units 18a, 18b, the second group 14 of motor units 20a, 20b and the third group 16 of electronic units 22a, 22b can be combined with one another at will.

Figure 3:
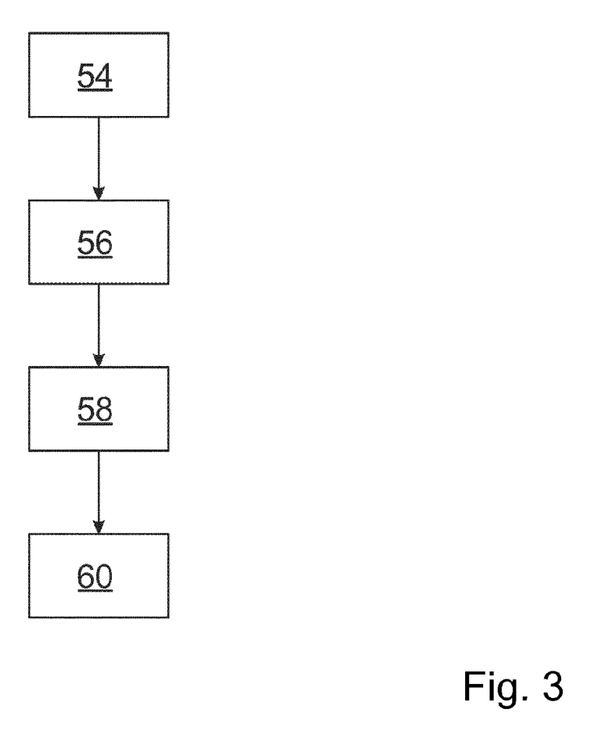
FIG. 3 shows a flow chart of a method for producing drives utilizing the modular system.

FIG. 3 shows a schematic flow chart of a method for producing drivers 10 using the modular system wherein a transmission unit 18a, 18b of the first group 12, a motor unit 20a, 20b of the second group 14 and an electronic unit 22a, 22b of the third group 16 are combined with one another. In one method step 54, one of the transmission units 18a, 18b is selected from the first group 12. In a method step 56, one of the motor units 20a, 20b is selected from the second group 14. In a method step 58, one of the electronic units 22a, 22b is selected from the third group 16. In a method step 60, the selected transmission unit 18a, 18b, the selected motor unit 20a, 20b and the selected electronic unit 22a, 22b are connected to one another in a force-locking and/or form-fitting and/or physically-bonded manner.

The invention claimed is:

1. A modular system for producing drives having different drive properties, with a first group of transmission units comprising at least two transmission units, with a second group of motor units comprising at least two motor units and with a third group of electronic units comprising at least two electronic units for actuating the motor unit which can be combined with one another to produce the drive, wherein the at least two motor units have essentially identical drive shafts which are provided for coupling to the transmission units, each drive formed by connecting a selected one of the transmission units, a selected one of the motor units, and a selected one of the electronic units, and further comprising a housing, wherein the selected one of the motor units is entirely contained within the housing, and wherein the selected one of the transmission units and the selected one of the electronic units are partially inserted into the housing at opposite ends thereof and interfaced with the selected one of the motor units.

2. The modular system according to claim 1, wherein any of the at least two transmission units, at least two motor units and at least two electronic units can be selectively combined with one another.

3. The modular system according to claim 1, wherein the at least two transmission units have different transmission ratios.

4. The modular system according to claim 1, wherein the at least two motor units belong to different motor power classes.

5. The modular system according to claim 1, wherein the at least two motor units belong to different motor voltage classes.

6. The modular system according to claim 1, wherein the at least two electronic units belong to different electronic power classes.

7. The modular system according to claim 1, wherein the at least two electronic units belong to different electronic voltage classes.

8. The modular system according to claim 1, wherein the at least two electronic units belong to different electronic function classes.

9. The modular system according to claim 1, wherein a fastening unit is provided to connect the selected one of the transmission units and/or the selected one of the motor units and/or the selected one of the electronic units mechanically and at least partially in a vibration isolated manner to at least one additional component.

10. The modular system according to claim 1, wherein the at least two electronic units can be arranged on sides of the at least two transmission units opposite from output sides of the at least two transmission units.

11. The modular system according to claim 1, wherein the at least two electronic units and the at least two transmission units can be arranged on opposite sides of the at least two motor units.

12. The modular system according to claim 1, wherein at least one of the at least two transmission units of the first group has a push-on pinion which is provided for receiving the drive shafts.

13. The modular system according to claim 1, wherein the at least two motor units have essentially identical magnetic sensors which are provided for coupling to the at least two electronic units.

14. The modular system according to claim 1, wherein each of the selected one of the transmission units and the selected one of the electronic units includes a first portion having a first diameter that is less than a second diameter of a second portion, and wherein the first portions are inserted into the housing.

15. The modular system according to claim 14, wherein the second diameters of the selected one of the transmission units and the selected one of the electronic units are equal to a diameter of the housing.

* * * * *